United States Patent [19]

Browning et al.

[11] 4,214,439
[45] Jul. 29, 1980

[54] MULTI COMPONENT PROPULSION SYSTEM AND METHOD

[75] Inventors: Joe L. Browning, Indian Head; Crestus L. Adams, Bryans Road, both of Md.

[73] Assignee: The United States of America as represented by the Secretary of the Navy, Washington, D.C.

[21] Appl. No.: 551,492

[22] Filed: May 13, 1966

[51] Int. Cl.³ .............................................. F02K 9/70
[52] U.S. Cl. ................................ 60/216; 60/39.46 P; 60/39.46 S; 60/257
[58] Field of Search ................ 60/204, 205, 216, 253, 60/257, 39.02, 39.03, 39.06, 39.46 R, 39.46 M, 39.46 P, 39.46 S, 39.46 G, 39.47

[56] References Cited

U.S. PATENT DOCUMENTS

| | | | |
|---|---|---|---|
| 3,048,966 | 8/1962 | Feraud et al. | 60/216 |
| 3,112,608 | 12/1963 | Bridgforth, Jr. | 60/216 |
| 3,112,609 | 12/1963 | Bridgforth, Jr. | 60/216 |
| 3,256,688 | 6/1966 | Hill | 60/204 |

*Primary Examiner*—Stephen C. Bentley
*Attorney, Agent, or Firm*—R. S. Sciascia; A. L. Branning

[57] ABSTRACT

A multi component propulsion system utilizing metallic fuel particles and a carrier gas as a propellant medium. The metallic particles and some of the carrier gas are carried from a fluidization chamber to the combustion chamber to be combusted with a liquid oxidizer. A major portion of the carrier gas is passed from the fluidization chamber to the combustion chamber to mix with the products of combustion of the oxidizer and metallic particles.

9 Claims, 1 Drawing Figure

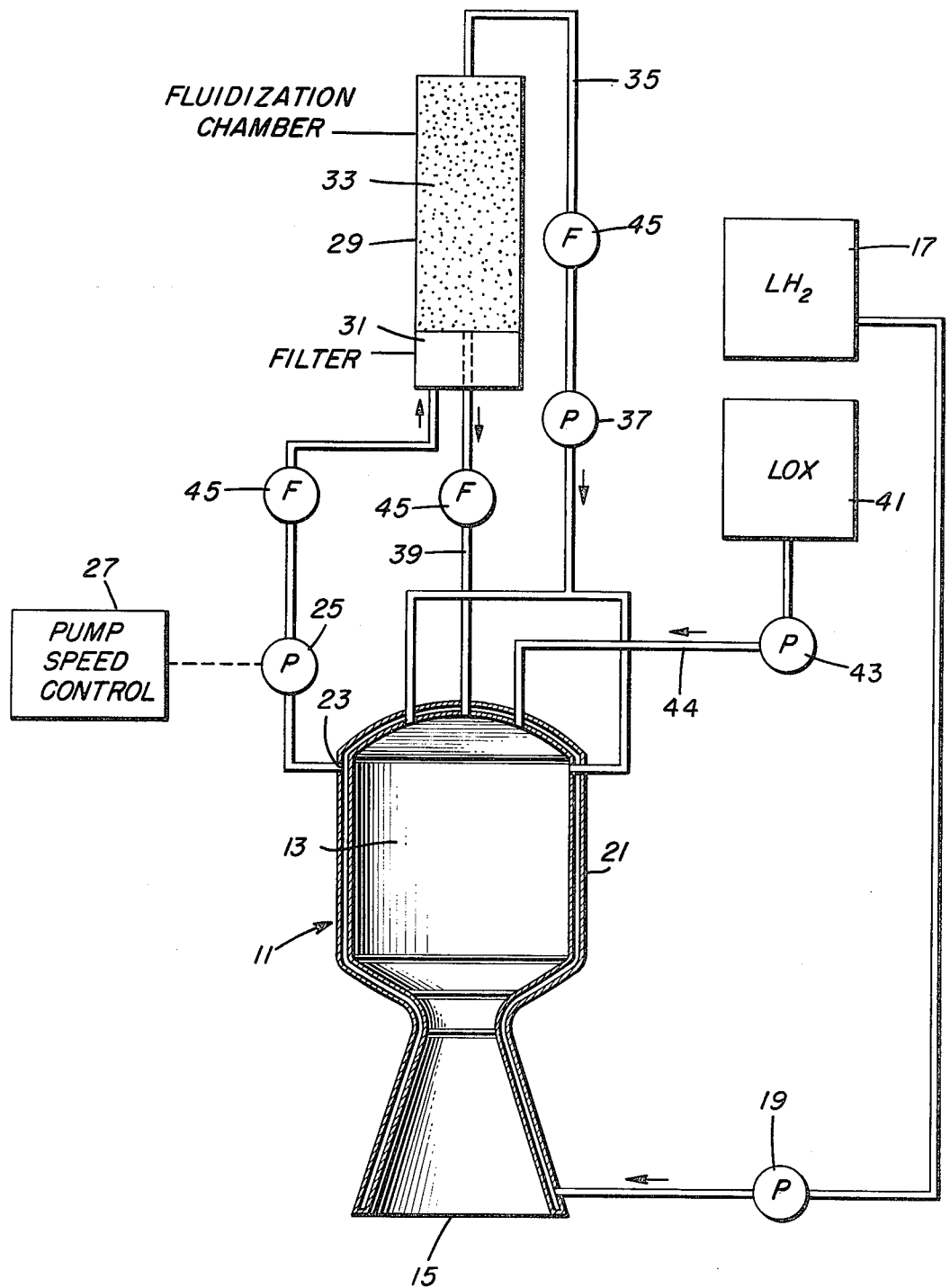

MULTI COMPONENT PROPULSION SYSTEM AND METHOD

The invention described herein may be manufactured and used by or for the Government of the United States of America for governmental purposes without the payment of any royalties thereon or therefor.

The present invention relates to a multi-component propellant system and particularly to a rocket propulsion system and method for utilizing a carrier gas and metallic fuel particles as a propellant medium.

In prior propellant systems utilizing metallic fuel particles as a propellant medium it has been the practice to inject the metallic particles directly into the combustion chamber, for example, by passing a stream of high pressure gas through a storage container of metallic particles. This procedure, while producing a workable multi-component propellant system, is subject to certain limitations. Among these are that due to the method of injecting the metallic particles into the combustion chamber, variations in metallic particle content occur thus causing a variation in metallic fuel flow rate, a limited extended steady state operation and poor reproducibility of a uniform metallic fuel delivery system. Further, no provision is made for accurately measuring metallic fuel flow rates to allow for accurate performance predictions throughout the flight path.

Prior art devices have also suffered from a low delivered specific impulse due to the relatively high molecular weight of the exhaust gases.

The general purpose of this invention is to provide a multi-component propulsion system that is capable of adaption to a wide variety of propellant injector designs as may be required for achieving reasonble propulsion system performance.

An object of the invention is to provide a multi-component propellant system that produces a high delivered specific impulse.

Another object is to provide a multi-component propellant system with greater capabilities for extended steady state operations.

Another object is to provide a multi-component propulsion system that permits the accurate measurements of metallic fuel flow rates.

A further object of the invention is to permit the accurate control and determination of carrier gas-metallic fuel ratio in a multi-component propulsion system.

A still further object of the present invention is the provision of a multi-component propulsion system that requires no special preparation of the metallic fuel, or its mixture with other materials, thereby simplifying preparations for operation.

A still further object of the invention is to provide a method for utilizing metallic fuels in a propulsion system.

Other objects and many of the attendant advantages of this invention will be readily appreciated as the same becomes better understood by reference to the following detailed description when considered with the accompanying drawing wherein:

The single FIGURE of the drawing is a diagrammatic plan of a preferred embodiment of the invention.

Referring to the drawing there is shown a rocket housing 11 including a combustion chamber 13 and a combustion chamber nozzle outlet to the atmosphere 15. Liquid hydrogen is pumped from a supply source 17 by a pump 19 through fuel regenerative passage 21 in the surrounding walls of the rocket housing. The liquid hydrogen in passage 21 acts as a coolant for the combustion chamber walls or for portions of the vehicle air frame and becomes vaporized during this cooling step. The vaporized hydrogen is then pumped through outlet 23 by pump 25 controlled by a pump speed control apparatus 27 and is passed into a fluidization chamber 29 through a filter element 31.

The fluidization chamber 29 contains metallic fuel particles 33, for example, aluminum, that are maintained in a fluidized condition by the upward flow of the carrier gas, the vaporized hydrogen. The filter element 31 assures a uniform distribution of the carrier gas over the diameter of the fluidization chamber.

It is to be understood that the carrier gas can be obtained from an independent source, such as from a small pressure bottle of hydrogen gas, and need not be restricted to use of the liquid hydrogen fuel which has been used as a coolant for the combustion chamber walls.

After passing through the bed of metallic fuel particles 33 the carrier gas is then recovered through fluid supply line 35 and pumped by pump 37 into the rocket combustion chamber 13. Since the carrier gas velocity, as described by Stokes Law, is a function of the "g" loads upon the vehicle the carrier gas flow rate must be varied to compensate for any variation in the "g" loads. This variation in the carrier gas flow rate is automatically accomplished by means of the pump speed control apparatus 27 which is responsive to any variations in "g" loads on the vehicle.

The fluidized metallic fuel particles 33 are transported through supply line 39 to the combustion chamber 13 by the pressure differential between the fluidization chamber and the combustion chamber. The pressure differential between the fluidization chamber 29 and the combustion chamber 13 is maintained by pump 25 which pressurizes the fluidization chamber to a pressure above that of the combustion chamber as it pumps the vaporized hydrogen into the fluidization chamber. It is apparent that the metallic particles are maintained in a fluidized state in the supply line 39 by entrainment and turbulence and that the metallic particle take-off port configuration can be adjusted to obtain any metallic fuel-gas ratio desired, for example, a wide mouth funnel configuration would produce the highest ratio.

A second liquid propellant such as liquid oxygen 41 is transported to and injected into the combustion chamber by conventional techniques, for example, pump 43 and passage 44, to an area of the combustion chamber near the inlet for the fluidized metallic particles. It is necessary to design the combustion chamber injector systems to achieve the metallic fuel combustion in a hydrogen lean oxidizer rich area, for example, oxygen concentrations in excess of 32 weight percent in the aluminum combustion zone.

It is desired to achieve fragmentation or starring type burning at flame temperatures in excess of 2700° K. In fragmentation burning, in the oxidizer rich zones of combustion, each metallic particle develops an oxide coating on the surface that inhibits the further transport of oxygen to the center portion of the particle. This oxide coating has a melting point near the boiling point of the pure metal, thus necessitating the high flame temperatures, and causes the center pure metal portion of each particle to boil then vaporize and shatter the oxide shell. By raising the oxygen content, the temperature of combustion is raised therefore maximum combustion temperature can be achieved by burning the metallic fuel with oxygen alone.

To achieve maximum specific impulse it is necessary to have a low molecular weight of the exhaust gas composition as a specific impulse is inversely proportional to the square root of the molecular weight of the exhaust gases. The recovered carrier gas, the hydrogen, is injected into the combustion chamber at a point or points located so as to not interfere with the aluminum combustion in the oxygen rich zone and to permit efficient mixing prior to discharge from the combustor. As a result of the mixing of the hydrogen with the products of combustion the molecular weight of the exhaust gases is lessened considerably in order to maximize delivered specific impulse.

Alternate spacing of the injectors for the aluminum combustion and the hydrogen injectors will produce zones of hot aluminum oxide clouds interspersed with cooled jets of hydrogen just outside the zones of combustion in the oxygen rich areas. Diffusion and turbulence will produce mixing, and therefore, transfer of heat to the hydrogen working fluid. For simplicity the drawing shows only one metallic and oxygen injector and two hydrogen injectors to the combustion chamber. It is to be understood that many more can be used the only criteria being that they be so spaced as to insure combustion in an oxygen enriched zone before the hydrogen working fluid is allowed to mix with the products of combustion.

Through the use of conventional mass flow rate devices 45 in the carrier hydrogen and metallic fuel particle delivery lines, accurate and continuous measurements of the metallic fuel particle and carrier gas ratios and flow rates may be made to allow for accurate performance predictions throughout the flight path.

Although the discussion has been limited to an aluminum-oxygen-hydrogen system it is to be understood that beryllium-oxygen-hydrogen, beryllium-ozone-hydrogen, lithium-fluorine-hydrogen and metal-air-hydrogen systems are equally applicable.

Various modifications are contemplated and may obviously be resorted to by those skilled in the art without departing from the spirit and scope of the invention, as hereinafter defined by the appended claims, as only a preferred embodiment thereof has been disclosed.

What is claimed is:

1. In a multi-component propulsion system having a combustion chamber,
   means to supply liquid hydrogen from a source of liquid hydrogen,
   a fluidization chamber,
   metallic particles in said fluidization chamber,
   means to allow vaporization of said liquid hydrogen,
   means for passing said vaporized hydrogen into said fluidization chamber to thereby activate said metallic particles therein to a fluidized state,
   passage means from said fluidization chamber to said combustion chamber to allow a small selected portion of said vaporized hydrogen and a selected portion of said fluidized metallic particles to pass into said combustion chamber,
   means to supply a liquid oxidizer to said combustion chamber to allow said liquid oxidizer to be injected into said combustion chamber to be combusted with said metallic particles, and
   a supply line from said fluidization chamber to said combustion chamber to recover a major portion of said vaporized hydrogen and to pass said recovered vaporized hydrogen into said combustion chamber to allow said vaporized hydrogen to mix with the products of combustion of said liquid oxidizer and said metallic particles.

2. The propulsion system of claim 1 wherein said combustion chamber includes a regenerative passage surrounding said combustion chamber, and
   wherein said regenerative passage is said means to allow vaporization of said liquid hydrogen.

3. The propulsion system of claim 1 wherein said liquid oxidizer is selected from the group consisting of oxygen, ozone and fluorine, and
   wherein said metallic particles are selected from the group consisting of aluminum, beryllium and lithium.

4. The propulsion system of claim 1 wherein said means for passing said vaporized hydrogen into said fluidization chamber includes means responsive to variations in load forces on said propulsion system to thereby vary the rate of vaporized hydrogen flow.

5. The propulsion system of claim 4 including mass flow rate measurement means to monitor the rate of flow of said vaporized hydrogen to said fluidization chamber and the rate of flow of said selected portions of said fluidized hydrogen and said fluidized metallic particles to said combustion chamber.

6. A propulsion system having a combustion chamber comprising:
   means for vaporizing a liquid carrier fluid,
   means responsive to said vaporized carrier fluid for fluidizing metallic particles,
   means for transmitting selected ratios of said vaporized carrier fluid and said fluidized metallic particles to said combustion chamber,
   means for carrying a liquid oxidizer to said combustion chamber,
   means for allowing said liquid oxidizer and said fluidized metallic particle to combust, and
   means for recovering a substantial portion of said vaporized carrier fluid and for transporting said substantial portion of vaporized carrier fluid to said combustion chamber to mix with the products of combustion of said liquid oxidizer and said metallic particles.

7. A process of utilizing metallic particles as a fuel medium in a propulsion system including the steps of,
   vaporizing liquid hydrogen,
   passing said vaporized hydrogen through a supply of metallic particles to thereby entrain said particles in said vaporized hydrogen,
   directing selected portions of said vaporized hydrogen and aid entrained metallic particles to a combustion chamber,
   supplying a liquid oxidizer to said combustion chamber,
   allowing said liquid oxidizer and said entrained metallic particles to combust, and
   recovering a major portion of said vaporized hydrogen and passing said recovered hydrogen to said combustion chamber to allow said vaporized hydrogen to mix with the products of combustion.

8. The process of claim 7 including the step of varying the flow of said vaporized hydrogen in response to variations in load forces on the propulsion system.

9. In a multi component system having a combustion chamber,
   the walls of said combustion chamber defining an enclosed regenerative passage therein, means to supply liquid hydrogen from a source of liquid hydrogen, means for passing liquid hydrogen to said regenerative passage to allow vaporization of said liquid hydrogen in said passage, a fluidization chamber having a filter at the lower end thereof, metallic particles in said fluidization chamber and supported above said filter, passage means from said regenerative passage to said fluidization chamber below said filter to allow said vaporized hydrogen to pass into said metallic particles for fluidizing said particles, passage means from said fluidization chamber to said combustion chamber to allow a selected portion of said fluidized metallic particles and a small portion of vaporized hydrogen to pass into said combustion chamber, means to supply a liquid oxidizer to said combustion chamber to allow said liquid oxidizer to be injected into said combustion chamber to be combusted with said metallic particles, and a supply line from said fluidization chamber to said combustion chamber to recover a major portion of said vaporized hydrogen and to pass said recovered vaporized hydrogen into said combustion chamber to allow said vaporized hydrogen to mix with the products of combustion of said liquid oxidizer and said metallic particles.

* * * * *